United States Patent [19]
Clayton et al.

[11] Patent Number: 6,050,488
[45] Date of Patent: Apr. 18, 2000

[54] CIRCUIT FOR DRIVING INDUCTIVE SENSORS FOR READING AND DEBITING PREPAID CARDS

[75] Inventors: Felipe Ricardo Clayton; Narcizo Sabattini Junior; Antenor Capelli Junior; Manuel Augusto Miranda dos Santos Pato, all of Campinas, Brazil

[73] Assignee: Telecomunicacoes Brasileiras S/A - Telebras, Campinas SP, Brazil

[21] Appl. No.: 08/875,264

[22] PCT Filed: Jan. 23, 1995

[86] PCT No.: PCT/BR95/00003

§ 371 Date: Jul. 18, 1997

§ 102(e) Date: Jul. 18, 1997

[87] PCT Pub. No.: WO96/23272

PCT Pub. Date: Aug. 1, 1996

[51] Int. Cl.[7] .............................. G06K 7/00; G06K 7/08
[52] U.S. Cl. ........................................... 235/450; 235/439
[58] Field of Search .................................. 235/439, 380, 235/450; 331/65

[56] References Cited

U.S. PATENT DOCUMENTS 3,780,269  12/1973  Hunn et al. .
4,672,183   6/1987  De Feo .
4,782,308  11/1988  Trobec et al. .

Primary Examiner—Michael G Lee
Assistant Examiner—Daniel Sherr
Attorney, Agent, or Firm—Finnegan, Henderson, Farabow, Garrett & Dunner, L.L.P.

[57] ABSTRACT

A read/write head circuit that insures the equivalence between the driving signal frequency and the resonance of the tank made up of an inductive sensor in parallel with a capacitor. The invention makes use of a voltage controlled oscillator (38)—VCO—to generate synchronism pulses (54) from the driving current generator (33), the controlling voltage being obtained from the comparison between the driving current and voltage phases through the resonant tank made up of the sensor (11) and capacitor (17) connected in parallel. The circuit further provides an amplitude limitation of the driving signal through the control of the driving current pulses applied to the inductive sensor.

9 Claims, 4 Drawing Sheets

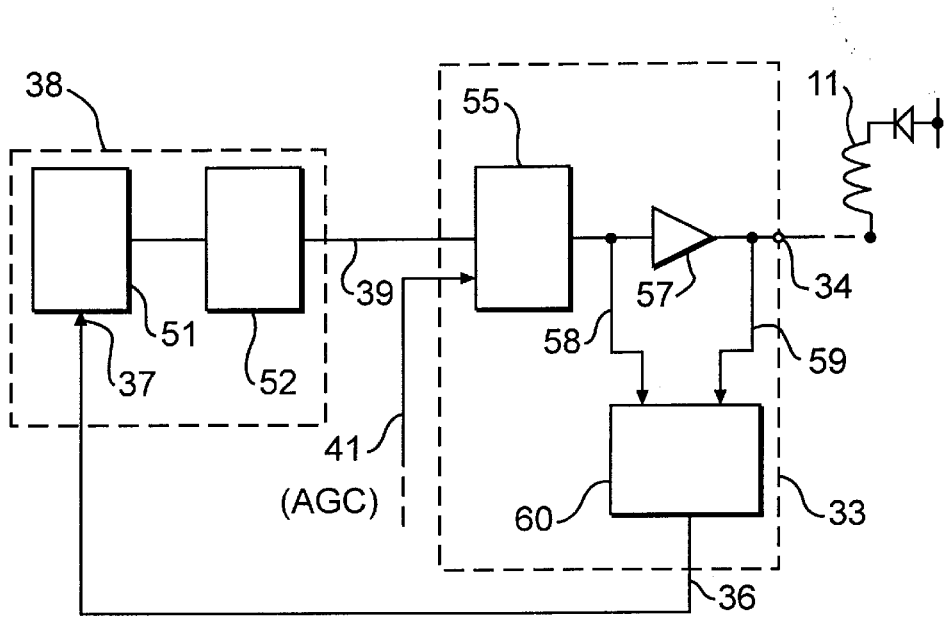
FIG. 3A
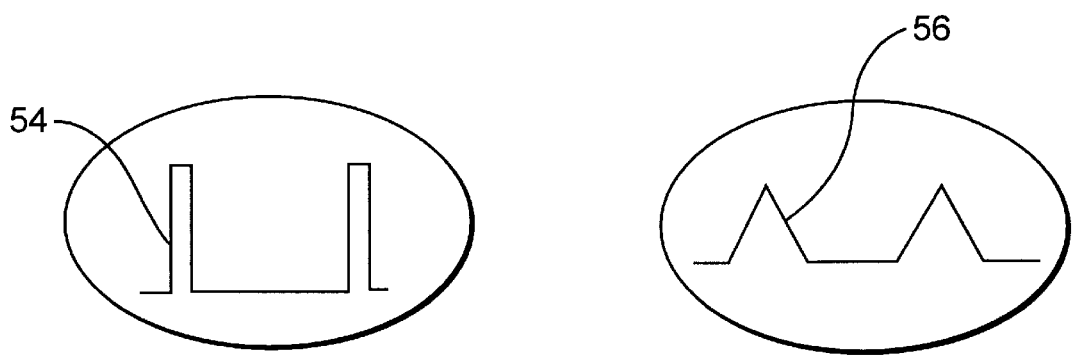
FIG. 3B  FIG. 3C

CIRCUIT FOR DRIVING INDUCTIVE SENSORS FOR READING AND DEBITING PREPAID CARDS

BACKGROUND OF THE INVENTION

1. Field of the Invention

This invention refers to public telephone sets using debit cards having inductive cells of the kind described in patent documents BR 7804885, BR 2558917, BR 8805894, BR 8801921 and BR 9203968.

2. Description of the Related Art

Reading and recording devices for such cells have been thoroughly studied, having in mind the decrease of manufacturing costs, increased dependability as well as size reduction of public telephone sets.

The inventions described in patent applications BR 9203968 and BR 9204434 seek to achieve such aims through a reduction in the number of electronic components used in the sensor driver circuits. Accordingly, the second of these documents describes the replacement of one of the semi-planes of inductive sensors by a slab of high permeability magnetic material, a procedure which not only halves the quantity of coils, but also eliminates the serial interconnecting elements which link each sensor coil to its correspondent opposite semi-plane. Furthermore, the number of soldered connections has been decreased and the connectors needed for said connections have been eliminated, as shown in FIG. 3 of said patent application.

The fabrication of the circuits described in the mentioned documents by means of discrete components requires specialized workmanship which burdens its cost. Furthermore, fitting the individual components one by one results in a lack of uniformity among the devices, besides shortening their life span, which should be as long as possible in hardware designed to operate for long periods under adverse conditions, such as in the case of public telephones. Moreover, esthetic reasons require a reduction in the volume of public telephone sets.

The techniques of large scale integration, on the other hand, are based on automated techniques of manufacturing and device testing, ensuring an almost total uniformity at a cost many times lower than conventional circuitry, besides bringing a substantial reduction of its physical dimensions.

However, the limitations of some components turned out by the integration technique prevent the mere transposition of standard circuit configurations used in conventional assemblies. This is the case, for instance, of the Colpitts sine wave oscillators shown in FIGS. 5 and 6 of document PI 9203968, since the application in question requires features of combined power and cut-off frequency which are beyond the capabilities of monolithic integrated devices fabricated with current production techniques.

On the other hand, the use of oscillators operating at pulsed modes, as described in document PI 8901590 may give rise to misreadings of the cell condition. This is due to the fact that the discrimination between an inductive sensor loaded with a short circuited cell and another loaded with a burned out cell is improved when such sensors are connected in parallel with capacitors so as to make up parallel resonant, or tank, circuits. Due to the variations of the inductance and capacitance values of commercially available components, the resonance frequencies of such tank circuits in a given reading/recording device are not exactly the same, bringing about a lack of coincidence between those circuits and the excitation current generated by the oscillator.

SUMMARY OF THE INVENTION

In view of the foregoing, the present invention aims to provide a reading/recording head arrangement which ensures the identity between the frequencies of the sensor driving current, and that of the tank formed by the sensor and associated capacitor, even if the latter frequency varies from unit to unit.

Another aim of the invention is to provide a reliable and efficient driver oscillator, either when assembled with discrete components or when manufactured through monolithic integration tecniques.

The present invention is based upon the property of tank circuits, that the phase difference between the driving current and the voltage across the tank terminals Is proportional to the difference between the driving signal frequency and tank's resonant frequency, allowing to obtain, by means of comparing the phases, an error voltage which modifies the frequency of said driving signal, making it substantially equal to the tank's resonance.

In accordance with another aspect of the invention, the error voltage is forwarded to a VCO (Voltage Controlled Oscillator) which generates the aforementioned driving signal.

In accordance with a further aspect of the invention, the LC tank comprises the inductance of the selected sensor coil of the read/write head and a capacitor connected in parallel with said coil.

In accordance with a still further aspect of the invention, the circuit provides limitation of the current through the sensor coil, in order to avoid an excessive value of this current which could lead to switching errors in the central office.

BRIEF DESCRIPTION OF THE DRAWINGS

In order that the invention may be readily carried into effect, it will now be described in detail, by way of example, with reference to the accompanying drawings, in which:

FIG. 3 shows, by means of a block diagram, the stages involved in the generation and frequency control of the sensor driving signal, according to the principles of the present invention.

DETAILED DESCRIPTION OF THE PREFERRED EMBODIMENT

Figure 1:
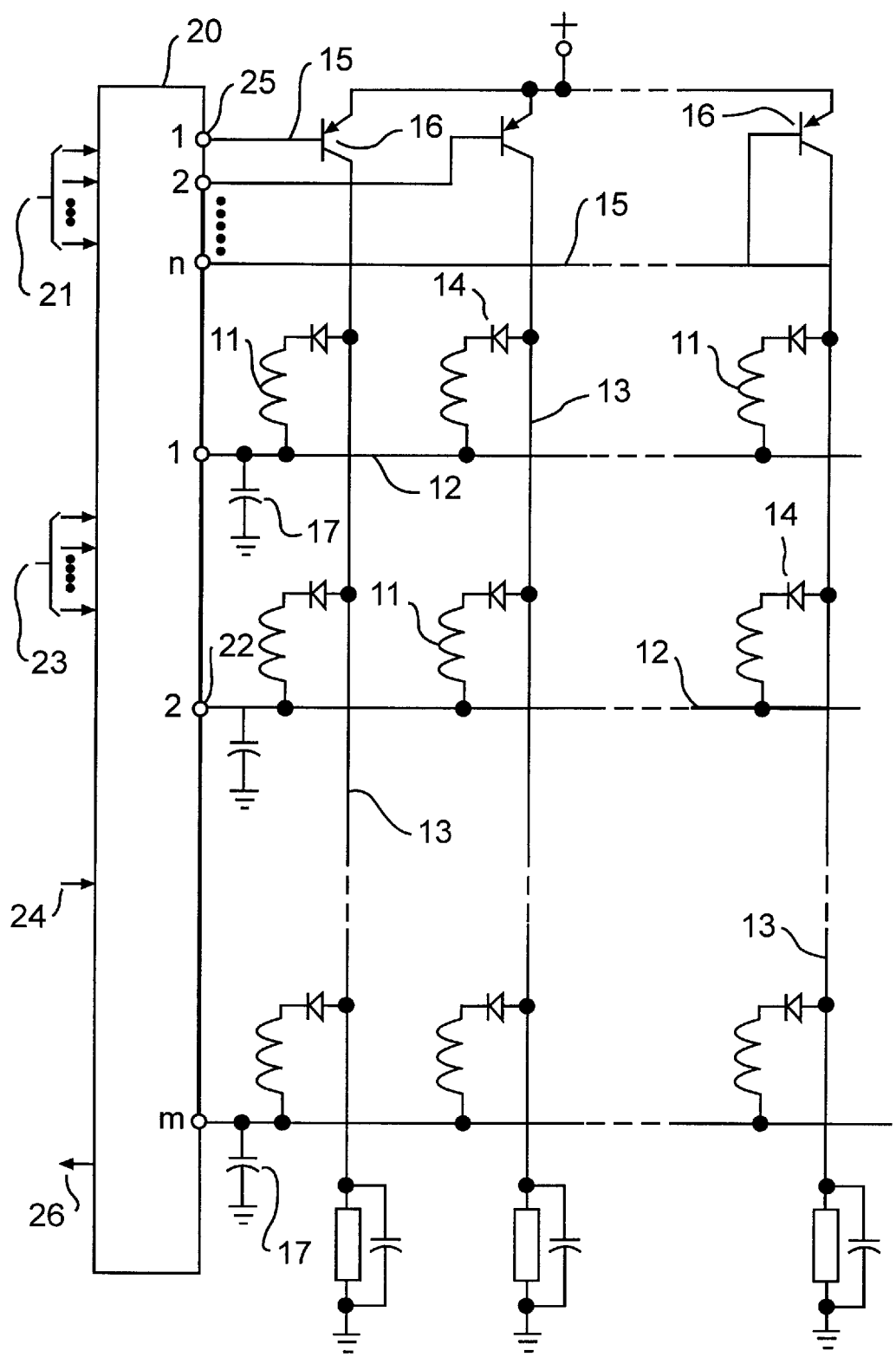
FIG. 1 shows the general schematic diagram of the reading head in a public telephone set using inductive debit cards according to the principles of the present invention.

As shown in the drawing of FIG. 1, the read/write head comprises a group of electrical conductors 12, 13 arranged orthogonally in a rectangular matrix having m lines and n columns; at each crossing point, an inductive sensor 11 is placed, with its lower end connected to the corresponding line and its upper end connected, by means of a series diode 14, to the corresponding column. The read/write head also comprises a line driver/selector circuit 20, having m driver current outputs 22, each one connected to a line 12, and n column enabling outputs 25 connected, by means of the lines 15, to transistor bases 16 which act as electronic switches for the selection of one among the m×n inductive sensors, the column selection being made from the address decoding of the corresponding column introduced in said circuit 20 by means of inputs 21, and the line selection being made by enabling the oscillator connected to one of said outputs 22, starting from the decodification of the address introduced by inputs 23, capacitor 17 being connected between each line m and the ground, forming a resonant circuit with the inductance of sensor 11 selected during the reading and recording of cells. The generation of line and column addresses, introduced by means of sets 23 and 21, respectively, which define the position of each cell being read or recorded, is performed by a microprocessor, external to said reading head, whose function is to control the functioning of the telephone set, not being included in the present invention.

Figure 2:
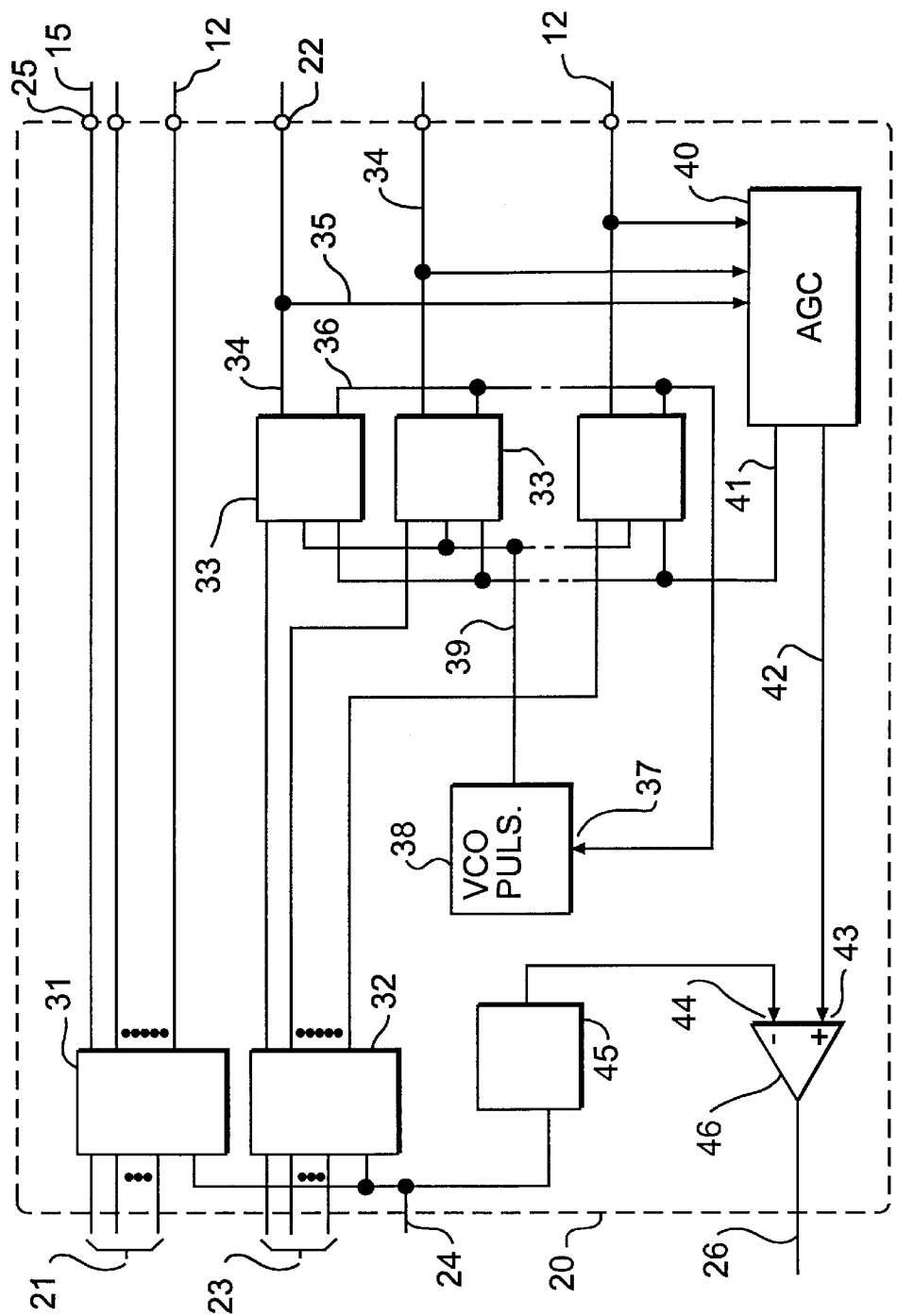
FIG. 2 shows, by means of a block diagram, the sensor selection circuit, the driving signal generator for the sensors and the discriminator of presence or absence of credit according to the principles of the present invention.

According to FIG. 2, selector/driver 20 comprises the following blocks:

a column address decoder 31 whose input is the set of lines 21 and whose n outputs are connected to the column selecting transistor bases 16 through terminals 25 and leads 15, as shown in FIG. 1;

line drivers 33, equal in number to the number of lines, having its outputs 34 connected to the lines 12 by means of output terminals 22 and lines 12;

a line address decoder 23, whose input is the line set 23, having m outputs, each enabling the operation of one driver 33;

a voltage controlled oscillator VCO PULS. 38, generating a pulse train whose frequency is controlled by the phase error signal introduced in input 37. This signal is supplied by output 36 of the driver stage currently enabled, as will be described later on;

a voltage discriminator circuit 40, which monitors the sensor driving signal voltage in lines 12, to which it is connected by means of lines 35. The value of this voltage depends on the state of the cell inductively coupled to said sensor; its rectification and filtering yields two signals, the first being an AGC (Automatic Gain Control) voltage at output 41 which is forwarded to line drivers 33 for the limitation of the sensor driving current. The second signal, at output 42, indicates the state of the cell;

a voltage comparator 46, comprising an operational amplifier whose first (non-inverting) input 43 receives the voltage rectified by stage 40, and whose second (inverting) input 44 is fed a reference voltage provided by power supply 45, yielding logic level output 26 showing the cell condition, i.e., whether it corresponds to a valid credit.

According to the principles of the invention, the alternating current in each line 12, feeding selected sensor coil 11, depends on the credit cell condition. If the cell Is unbroken, the sensor coil will be loaded by the reflected lmpedence of the short circuited turn coil equivalent to said cell, resulting in a voltage in line 12 smaller than when the coil turn is interrupted (burned out cell). When the latter condition takes place, said voltage tends to a very high value which might result in an excessive current through the sensor coil as well as through line driver 33.

Due to the fact that public telephone sets are powered by the central switching office which monitors the line currents, this electrical current surge, brought about by the above mentioned condition, may be erroneously intepreted by the central office, bringing about a wrong call connection. To avoid this, driver stages 33 comprise controlling means activated by the AGC signal supplied through block 40 by means of its output 41, whenever the alternate current voltage in lines 12 tends to reach values above a preset limit.

FIG. 3 shows the working principle of the frequency control of the driving signal fed to inductive sensors 11. As shown, this control comprises the blocks shown in the previous figure, references 33 and 38, and its operation will be described next.

Block 38 (VCO PULS.) comprises stage 51, a freerunning multivibrator producing a symmetric square wave whose period is controlled by the voltage fed back through terminal 37. This square wave is converted, by means of block 52, into a train of very narrow pulses 54, each pulse corresponding to the leading edge of wave 53. This pulse train is forwarded, through line 39, simultaneously to the inputs of all line drivers 33, as shown in FIG. 2.

Figure 4:
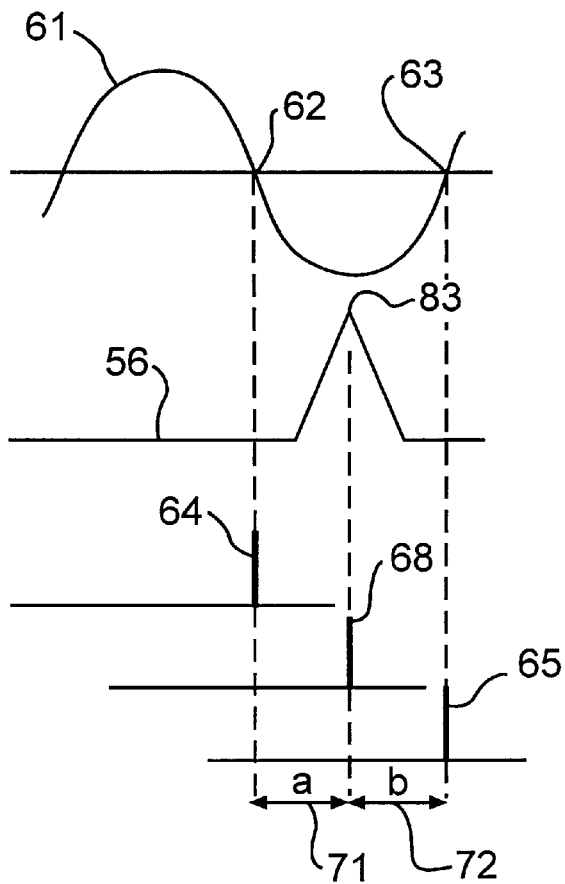
FIG. 4 illustrates the wave forms associated with the frequency control in the circuit of the previous figure according to the principles of the present invention.
Figure 5:
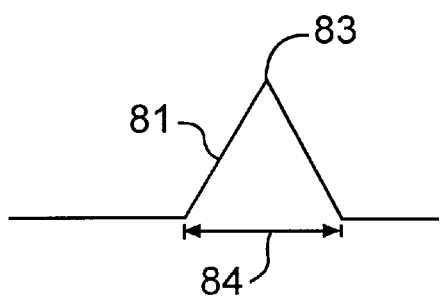
FIG. 5 shows the operation of the current limiter in the circuit of FIG. 3 according to the principles of the present invention.
Figure 5:
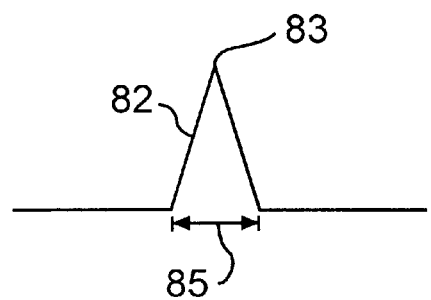

Still according to FIGS. 3 and 5, stage 55 receiving pulse train 54, generates a triangular pulse train 56, each triangular pulse comprising a positive upward ramp up to the peak instantaneous voltage value 83 followed by a negative downward ramp having the same slope, forming a triangular pulse having width 84, as detailed in FIG. 5. This wave is converted by driver 57 into a series of current triangular pulses which drive the selected sensor coil. This coil being part of a resonant circuit, the voltage in line 34, output of said driver stage, will be a substantially sinosoidal wave 61, as typified at the upper trace of FIG. 4.

Still according to the invention principles, samples of the mentioned current and voltage waves present in line 34 which feed sensor 11, are forwarded to the first and second inputs of phase comparator 60, by means of lines 58 and 59 respectively. As shown in FIG. 4, these samples are used by the phase comparator to generate pulses 64 and 65 at zero crossing points 62, 63 of sinewave 61, as well as pulse 68, at peak 83 of the triangular current wave. Since the latter wave is virtually of the same shape and simultaneous in time to signal 56 applied to input of stage 57, it can be monitored indirectly by sampling the voltage 56 applied to the input of phase comparator 60 through line 58.

Circuit 60 makes the comparison between periods 71(*a*) and 72(*b*) and integrates the error signal, said periods corresponding, respectively, to the intervals between pulses 64 and 68, and between pulses 68 and 65. If intervals a and b are equal, then the electrical current and voltage of the tank, formed by the selected sensor coil and capacitor 17 of the respective line, will be in phase; therefore, the correction voltage at output 36 will be equal to a rest value. If time a is longer than time b, an error signal having a positive polarity will be generated which is added to the rest value and forwarded to input 37 of free-running multivibrator 51, increasing the oscillation frequency and shifting peak 83 of the current wave to the left so as to move it towards the center of the semi-period between pulses 64 and 65.

If, on the other hand, a is smaller than b, the signal error will be a negative voltage, reducing the base voltage and decreasing the frequency of wave 54 generated by VCO 38, which will shift the mentioned peak 83 of the electrical current wave to the right.

FIG. 5 shows the working principle of the control of the sensor driving current, as generated by the driver. Wave 81 corresponds to a normal condition and wave 82 to the case in which the AGC is activated as a response to an excessive voltage sine wave amplitude in line 34. In the latter case, the rectified and filtered voltage forwarded through line 41 to the second input of the triangular pulse generators 55, will bring about a steeper slope, both in the upward and downward segments; therefore, value 83 will be reached sooner, as well as the zero return time will be shorter. Consequentely the base of the triangular electrical current pulse will be narrower, time 85, and thus the electrical current used up by the circuit will be smaller since it is proportional to the area of the triangle. In this way, the power consumption of the telephone set will not rise above the limit of 40 mA (average value), stipulated for public telephone sets.

The AGC control further allows compensation of signal amplitude differences 61 due to the "Q" variations between sensors, since the electrical current pulse control injected into the sensor coil results in the control of the amplitude of the said sine curve voltage which is related to the current through the "Q" value of the resonant device. This results in more homogeneous amplitude values for the interrupted cell state, increasing the dependability of the discrimination between the "open" and "shortcircuited" conditions.

Even though the invention has been described based on a particular embodiment, it should be understood that variations and modifications can be made, without falling outside the scope of the invention.

Likewise, the VCO circuitry may be different from the one shown here provided the resulting signal has characteristics suitable for the timing of block 33. Moreover, the described circuitry may also be assembled by the traditional methods using discrete components, as well as monolithic integrated circuit techniques, hybrid circuits or thick film, keeping within the the conceptual limits of the invention.

We claim:

1. A circuit for driving inductive sensors for reading and debiting prepaid cards comprising:

m line conductors and n column conductors arranged in a matrix array;

a plurality of inductive sensors, one connected between each intersecting line and column conductors;

a capacitor connected in parallel to said inductive sensor, thereby forming a resonant circuit;

a driving signal generator for applying a driving signal to each inductive sensor;

a feedback network connected to each inductive sensor for determining the phase difference between the current and the voltage of the driving signal at each said inductive sensor;

said feedback network comprising a closed feedback loop for applying a correction signal representative of said phase difference to said generator;

said generator being capable of varying the frequency of said driving signal in response to the value of said correction signal;

whereby the frequency of the driving signal generator output is varied in accordance with said phase difference.

2. A circuit for driving inductive sensors for reading and debiting prepaid cards, according to claim 1, further including: a limiter circuit connected to said line conductors and said generator for limiting the amplitude of the driving signal applied to each inductive sensor.

3. A circuit for driving inductive sensors for reading and debiting prepaid cards according to claim 1, wherein:

said generator comprises a voltage-controlled oscillator whose frequency is controlled by said correction signal.

4. A circuit for driving inductive sensors for reading and debiting prepaid cards, according to claim 3, wherein:

said inductive sensors are driven by an electrical current pulse train wherein each pulse has a substantially symmetrical triangular waveform.

5. A circuit for driving inductive sensors for reading and debiting prepaid cards, according to claim 1, 2 or 3, wherein:

the voltage at the terminal of each inductive sensor to which the driving signal is applied has a substantially sinusoidal voltage waveform.

6. A circuit for driving inductive sensors for reading and debiting prepaid cards, as set forth in claim 1, wherein said feedback network comprises:

a phase comparator circuit for comparing the phases of the voltage and current of the driving signal at the sensor terminal and for generating an output voltage proportional to the difference between said phases;

an oscillator connected to said phase comparator circuit and controlled by the output voltage of said phase comparator circuit for producing a train of synchronizing timing pulses having a narrow rectangular waveform;

an automatic gain control voltage signal generator;

a triangular pulse generator for generating symmetric pulses having a triangular waveform, said triangular pulse generator being provided with a first input terminal connected to said oscillator for receiving said timing pulses to thereby trigger the beginning of the upward ramp of the triangularly-shaped waveform and a second input terminal for receiving the automatic gain control voltage signal from said automatic gain control voltage signal generator for controlling the width of said triangular pulses by means of slope variation of the upward and downward ramps of said triangular wave; and an amplifier stage having an input connected to said triangular pulse generator for changing the triangular voltage pulses applied to said input into triangular current pulses which are phase synchronized with said voltage pulses for driving the sensors.

7. A circuit for driving inductive sensors for reading and debiting prepaid cards, as set forth in claim 4, wherein:

said limiter circuit limits the amplitude of the driving signal by varying the slope of the upward and downward ramps of the triangular pulse of the driving current.

8. A circuit for driving inductive sensors for reading and debiting prepaid cards, as set forth in claim 6, wherein:

slope variations in the upward and downward ramps of the driving current triangular pulse are provided by said feedback network, which network comprises a phase comparator for comparing the phases of the current and voltage of the driving signal; a timing pulse generator; a triangular pulse generator; and a current amplifier.

9. A circuit for driving inductive sensors for reading and debiting prepaid cards, according to any one of the preceding claims, wherein:

the capacitor included in said resonant circuit is connected between a line conductor of the sensor matrix and ground.

* * * * *